(12) United States Patent
Agami et al.

(10) Patent No.: US 8,116,244 B2
(45) Date of Patent: Feb. 14, 2012

(54) METHOD AND APPARATUS FOR TRANSMITTING A SUPERFRAME ACROSS A COMMUNICATION NETWORK

(75) Inventors: Gregory M. Agami, Arlington Heights, IL (US); Jiangnan Chen, Hawthorn Woods, IL (US); Kadathur S. Natarajan, Wilmette, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 416 days.

(21) Appl. No.: 11/612,617

(22) Filed: Dec. 19, 2006

(65) Prior Publication Data

US 2008/0144567 A1 Jun. 19, 2008

(51) Int. Cl.
*H04B 7/00* (2006.01)
*H04W 4/00* (2009.01)

(52) U.S. Cl. ........................................ 370/310; 370/329
(58) Field of Classification Search ........... 370/328–338
See application file for complete search history.

(56) References Cited

U.S. PATENT DOCUMENTS

| | | | |
|---|---|---|---|
| 2001/0031639 A1* | 10/2001 | Makipaa | 455/450 |
| 2001/0053141 A1* | 12/2001 | Periyalwar et al. | 370/337 |
| 2002/0136170 A1* | 9/2002 | Struhsaker | 370/280 |
| 2003/0223365 A1 | 12/2003 | Kowalski | |

* cited by examiner

*Primary Examiner* — Jason Mattis
*Assistant Examiner* — Stephen J Clawson

(57) ABSTRACT

A method and apparatus includes a scheduling entity (308) for scheduling and transmitting the superframe (402) across a communication network (200). The controller (310) coupled with scheduling entity (308) groups the subscriber unit (304) into one of the plurality of groups. The scheduler entity (308) assigns a coding scheme for each group and encodes each frame of the superframe (402) based upon the assigned coding scheme for the group, to which the frame is to be transmitted. The transceiver (316) coupled with controller (310) via hardware interface (314) receives the encoded superframe and transmits the superframe to the plurality of subscriber units in the communication network (200).

20 Claims, 6 Drawing Sheets

METHOD AND APPARATUS FOR TRANSMITTING A SUPERFRAME ACROSS A COMMUNICATION NETWORK

FIELD OF THE INVENTION

The present invention generally relates to scheduling and transmitting frames across a communication network and more particularly to scheduling and transmitting frames having varying repetition rates across the communication network.

BACKGROUND

A wireless communication system provides a two-way communication between a plurality of fixed or portable subscriber units and a fixed network infrastructure such as base station or an access point. The fixed network infrastructure uses a broadcast message to establish links for the two-way communication. The broadcast message is sent in the wireless communication system as a part of a frame. One type of broadcast message is a media access protocol (MAP) message. The MAP message occupies a significant portion of the frame as it contains information necessary for establishing and maintaining communication in the wireless communication system. The MAP message therefore reduces the amount of space in a frame that can be used for transmitting user data.

In current systems, the MAP message is encoded with a constant coding scheme for all the subscriber units irrespective of the subscriber units' position in a cell or other network criteria. The constant coding scheme may keep the overhead at an acceptable level. But using constant coding scheme reduces the coverage area of the cell. Furthermore, the MAP message encoded with constant coding scheme is not robust enough to be received by the subscriber units residing at the edge of the cell having a poor channel quality.

Accordingly, there is a need for more effectively transmitting the frames across a communication network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
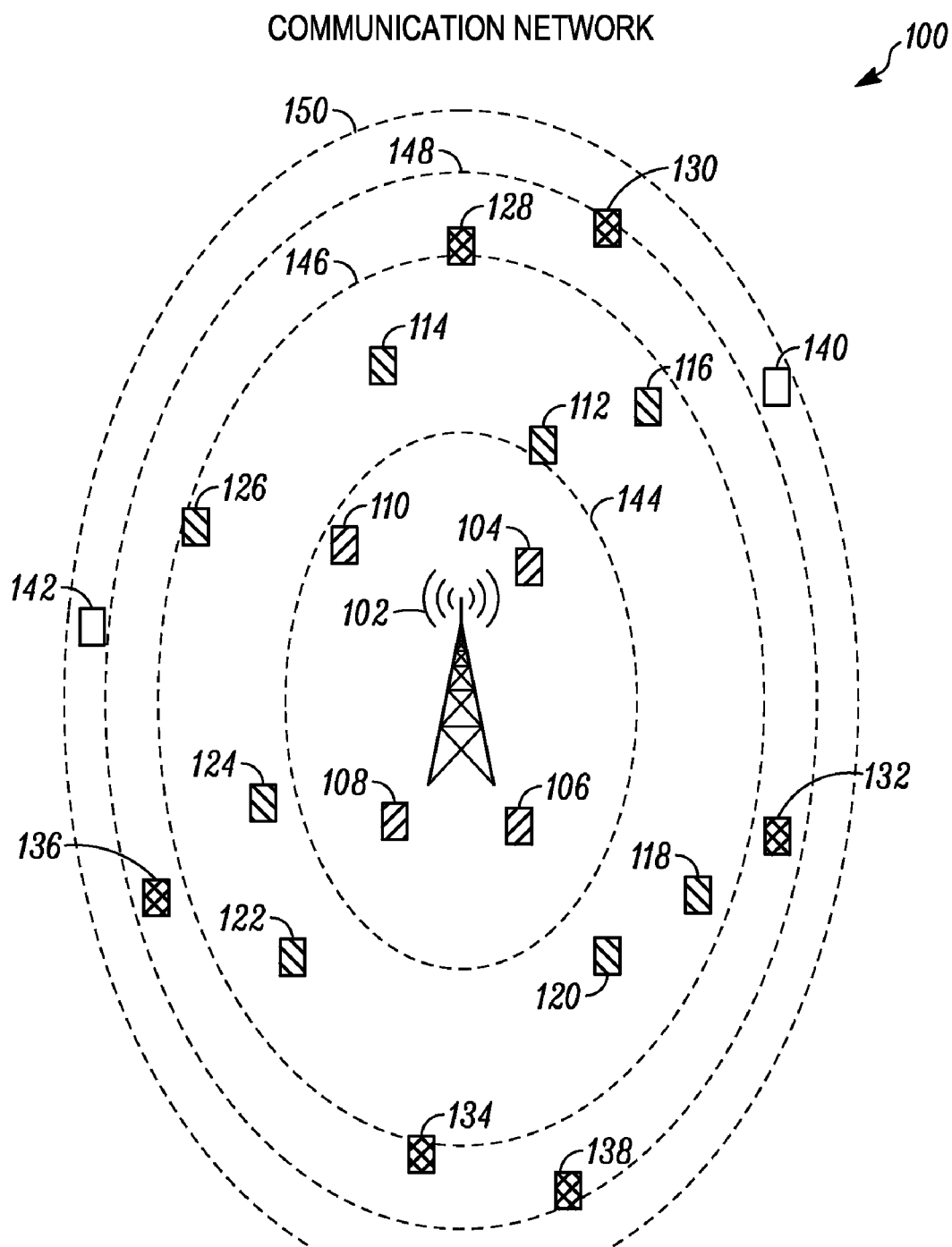
FIG. 1 is an abstract model of wireless communication network in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in scheduling and transmitting a superframe having a plurality of frames, across the communication network. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of scheduling and transmitting a superframe across a communication network are described herein. The non-processor circuits may include, but are not limited to, a radio receiver, a radio transmitter, signal drivers, clock circuits, power source circuits, and user input devices. As such, these functions may be interpreted as steps of a method to perform scheduling and transmitting the superframe to the plurality of subscriber units in the communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Various embodiments are disclosed herein. For example, one method for transmitting a superframe having a plurality of frames from a communication node to a plurality of subscriber units in a communication network includes determining a criteria associated with each subscriber unit of the plurality of subscriber units. The method also includes grouping each subscriber unit into one of a plurality of groups based upon the determined criteria and determining a coding scheme for each one of the plurality of groups wherein at least one of the plurality of groups has its coding scheme different from at least another one of the plurality of groups. The method further includes coding the superframe so that each frame is encoded at the coding scheme for the group and transmitting the superframe to the plurality of subscriber units.

Another embodiment includes a system for transmitting a superframe having a plurality of frames across a communication network. The system includes a plurality of subscriber units and a communication node capable of communicating with each subscriber unit. The communication node includes a hardware interface receiving a criteria associated with each subscriber unit and a controller coupled to the hardware interface. The controller groups each subscriber unit into one of a plurality of groups based upon the criteria received from the hardware interface. A scheduler is coupled to the controller for assigning a coding scheme for the groups and coding the plurality of frames so that each frame is encoded at the coding scheme for the groups, and wherein at least one of the plurality of groups has its coding scheme different from at least another one of the plurality of groups. A transceiver coupled to the hardware interface for transmitting the superframe to the plurality of subscriber units.

In an embodiment, a communication node is provided. The communication node includes a hardware interface receiving a criteria associated with each subscriber unit and a controller coupled to the hardware interface. The controller groups each subscriber unit into one of a plurality of groups based upon the criteria received from the hardware interface. A scheduler is coupled to the controller for assigning a coding scheme for the groups and coding the plurality of frames so that each frame is encoded at the coding scheme for the groups.

FIG. 1 illustrates an abstract model of wireless communication network 100, referred to as communication network 100. The communication network 100 includes a communication node 102 and a plurality of subscriber units 104-142 located at different positions surrounding the communication node 102. The communication node 102 and the subscriber units 104-142 are configured to operate according to any of a number of different 3G or 2G technologies. These include Global System for Mobile Communications (GSM), Code Division Multiple Access (CDMA), Universal Mobile Telecommuncation System (UMTS), CDMA2000, Wideband CDMA (W-CDMA), Orthogonal Frequency Division Multiplexing (OFDM) and other technologies. Likewise, the communication node and subscriber units in other communication networks are configured to operate according to the different wireless technologies. It is possible that neighboring communication networks can operate using the same or different wireless technologies. The communication node 102 may also communicate with other communication node and with subscriber units using an IEEE-802.16 based wireless metropolitan area network. A different wireless protocol may employ the principles of the present invention.

In an embodiment, the communication node 102 may be a base station, an access point, an access router or other similar network component. The communication node 102 provides wireless broadband access to the subscriber units 104-142 within its coverage area of the communication network 100. The subscriber units 104-142 may use the broadband network to access voice, data, video, video teleconferencing and/or other broadband services. The subscriber units 104-142 may be any of a number of mobile devices, including a wireless-enabled laptop computer, a personal data assistant, a notebook computer, a handheld device, a cellular phone, a personal computer, a personal digital assistant or other wireless-enabled device. Furthermore, while only twenty subscriber units 104-142 have been depicted in FIG. 1 to avoid cluttering the drawing, it is understood that the communication network 100 may provide wireless broadband access to more or less subscriber units.

In operation, a data message sent by the communication node 102 to the subscriber unit is known as downlink communication. Similarly, the data message sent by the subscriber unit to the communication node 102 is known as uplink communication. The data message may be referred to a packet, variable sized data units, or a superframe. The superframe is formed from multiple frames that are to be transmitted from the communication node 102 to the subscriber unit in the downlink communication. Each frame comprises a media access protocol message (MAP) that is used as a broadcast message for allocating a channel to the subscriber unit.

In an embodiment of FIG. 1, each dotted line depicts the extent of groups 144-150, respectively. Each of the groups 144-150 covers a given geographical area within the communication network 100. The communication node 102 receives a criteria from each of the subscriber units 104-142. Further, the subscriber units 104-142 are grouped into one of the groups 144-150 based on the received criteria. The criteria may be a distance between the communication node 102 and the subscriber unit, a channel quality index of the channel associated with the subscriber unit, or other classifications used for grouping the subscriber units.

In the embodiment of FIG. 1, the criterion refers to the distance between the subscriber unit and the communication node 102. The distance varies as the subscriber unit move to a different position in the communication network. Each subscriber unit is associated with a channel, and signal strength of the channel varies as the distance between the communication node and the subscriber unit changes. The communication node records the change of distance at regular intervals and accordingly groups the subscriber unit into one of the four shown groups 144-150. The subscriber units that reside close to the communication node 102 may have good signal strength and hence receive the frames without any error or distortion. For example, the subscriber units 104-110 that are positioned close to the communication node 102 may be placed in group A (144). Similarly, the subscriber units 140, 142, residing at the edge of the communication network 100, may have poor signal strength as they are positioned far away from the communication node 102. Ideally, a signal is robust enough to reach the subscriber units 140, 142 with an acceptable distortion or signal loss. The signal strength decreases as the subscriber unit move away from the communication node 102. Thus, the subscriber units 104-142 are grouped into one of the group 144-150 based on their position and distance from the communication node 102.

In the embodiment of FIG. 1, the groups 144-150 are concentrically positioned. The inner groups 144, 146 may also receive the frames transmitted to the outer groups 148, 150. For example, the frames transmitted from the communication node 102 to the subscriber unit positioned in group 150 may also be received by the subscriber units residing in groups 144, 146, 148.

Figure 2:
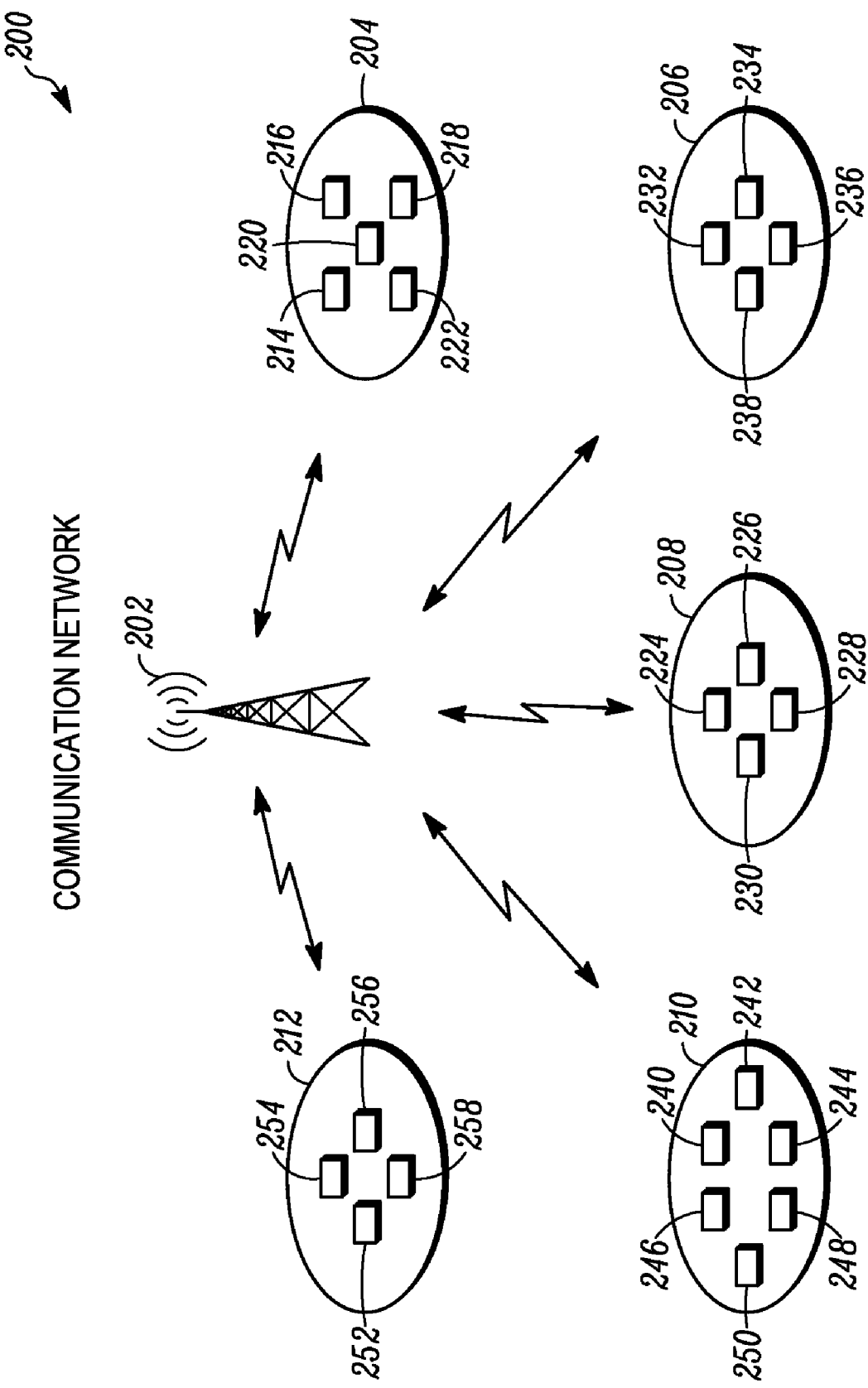
FIG. 2 is a block diagram of wireless communication network in accordance with some embodiments of the invention.

Turning to FIG. 2, a wireless communication network 200, hereafter referred to as communication network 200 is shown. The communication network 200 includes a communication node 202 and subscriber units 214-258 that are located at different positions in the communication network 200. The communication network 200 may include one or more communication node 202. The communication node 202 may be an access point, a base station, or an access router. The communication node 202 is arranged and configured to provide wireless communication to the subscriber units 214-258 in the communication network 200.

In an embodiment of FIG. 2, the subscriber units 214-258 are grouped based on a criteria other than the distance from the communication node 202. The criteria may be a channel quality index of a channel associated with each subscriber unit in the communication network 200. The subscriber unit keeps track of the channel quality index and updates to the communication node 202 at regular intervals. The channel quality index may be determined by using signal strength of the channel, a signal to noise ratio, a forward error rate of the frame and other channel parameters. The communication node 202 records the channel quality index received from each subscriber unit and accordingly groups the subscriber units into one of the plurality of groups 204-212. The groups 204-212 may have any number of subscriber units and each group has subscriber units with channel quality index within a determined range. In another embodiment, the groups can be arranged according to similar applications or other useful criteria.

Figure 3:
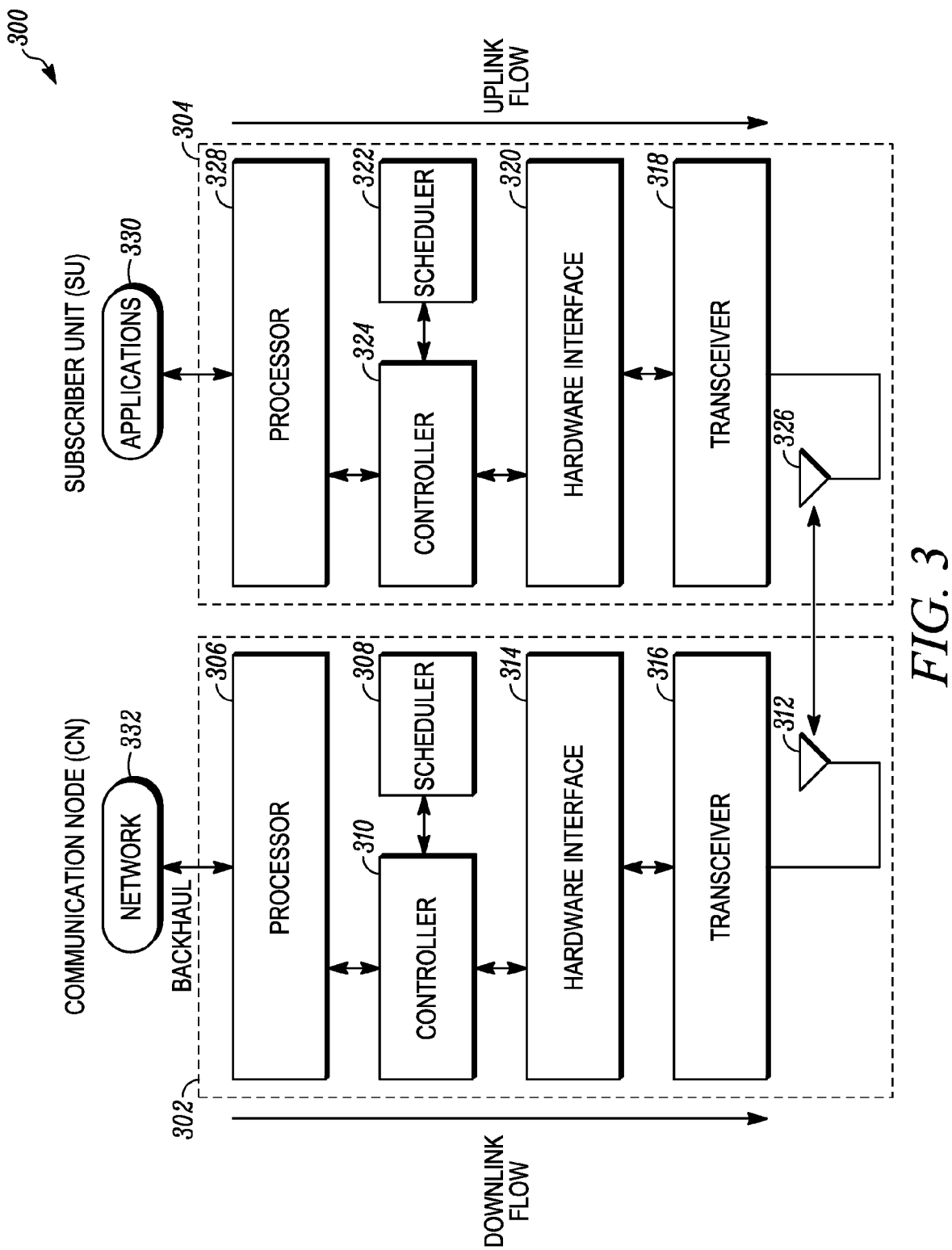
FIG. 3 is a block diagram of a communication node and a subscriber unit in accordance with some embodiments of the invention.

FIG. 3 is a block diagram of a communication node 302 and a subscriber unit 304 within a communication network of the present invention. The communication node 302 may be comprised of a transceiver 316 that transmits and receives signals, a hardware interface 314 for buffering the frames and interfacing the transceiver 316 and a controller 310, a processor 306 coupled with the controller 310 for interfacing the controller 310 with a user application, networks or other higher layers in a device, and a scheduler 308 coupled with the controller 310. Similarly, in an uplink communication, the subscriber unit 304 that supports the features of the present invention may be comprised of a transceiver 318 that transmit and receive signals, a hardware interface 320 for buffering the frames and interfacing the transceiver 318 and a controller 324, a processor 328 coupled with the controller 324 for interfacing the controller with a user application, networks or other higher layers in a device, and a scheduler 322 coupled with the controller 324. The components described herein may also be implemented at the subscriber unit 304 for an uplink communication.

In an embodiment of FIG. 3, the hardware interface 314 coupled with the transceiver 316 communicates across the communication network via at least one antenna 312. The controller 310 and the transceiver 316 communicate via the hardware interface 314. In particular, the controller 310 coupled to the processor 306 submits fixed-or variable-sized data units, cells, packets or frames, generally referred to as "frames", to the transceiver 316. The transceiver 316 further transmits the received frames to the subscriber unit 304. The controller 310 may also send user data frames, management frames and other data directly to the transceiver 316. The controller 310 submits a criteria for the group to the scheduler 308 of the communication node 302. Further, the transceiver 316 receives the scheduled frames from the controller 310 and transmits the frames across the communication network in accordance with parameters within the frame. The transceiver 316 also receives frames of information from the subscriber units via antenna 312 and provides the received frames to the controller 310 across the hardware interface 314. The transceiver 316 may also report status information to the controller 310. For example, the status information may include an indication of whether the frames have been transmitted successfully or not.

The particular configuration and implementation of the controller 310 depends upon the type of the communication network, its data transfer bandwidth and the type and amount of information being processed. In an embodiment of the communication node 302, the controller 310 along with the scheduler 308 is a management and frame scheduling entity that coordinates functions with other network-attached devices such as subscriber units, an access point, a base station and the like.

In an embodiment, the communication node 302 employing a transceiver 316 coupled with the hardware interface 314 receives the criteria associated with the subscriber unit 304. The criteria received are forwarded to the controller 310 via hardware interface 314. The controller 310 processes the criteria and accordingly groups the subscriber unit 304 into one of the groups. The grouping is carried out based upon one of the criteria associated with the subscriber unit 304. Furthermore, the controller 310 forwards the criteria for each group to the scheduler 308. The scheduler 308 assigns a coding scheme for each group based upon their respective criteria.

In one of the embodiments, the coding scheme may be a repetition coding scheme for the group. The repetition coding scheme includes assigning a repetition rate of the frame required for that group. The repetition rate is set according to the needs for the subscriber unit 304 within the group to receive the frame. For example, if the criterion chosen is channel quality index, then each group has a different coding scheme depending upon the channel quality index for the group.

The processor 306, coupled with the controller 310, maps external network data to access control data. The access control data may be a media access controller (MAC) service data unit (SDU). The processor forwards the access control data to the controller 310. The controller 310 receives a series of access control data and converts each access control data into frames by adding necessary header information. The frame may be a MAC packet data unit (PDU). In addition, the controller also manages the buffering of frames. The frames with necessary header information are forwarded by a bus system to the scheduler 308. The scheduler 308 receives the frames and the channel quality index for each group from the controller 310. The scheduler 308 forms a superframe from the received frames wherein each frame of the superframe is coded with the assigned coding scheme for the group to which the frame is to be transmitted. For example, if a frame is to be transmitted to the subscriber units in the second group then the frame is encoded with a coding scheme assigned for the second group. The encoding of the frame may be repetition of a media access protocol (MAP) message of the frame referred to herein as repetition rate. The repetition rate is assigned to each of the frame depending upon the group to which it is to be transmitted. The coded frames are finally transmitted to the plurality of subscriber units via hardware interface 314 and the transceiver 316.

Figure 4:
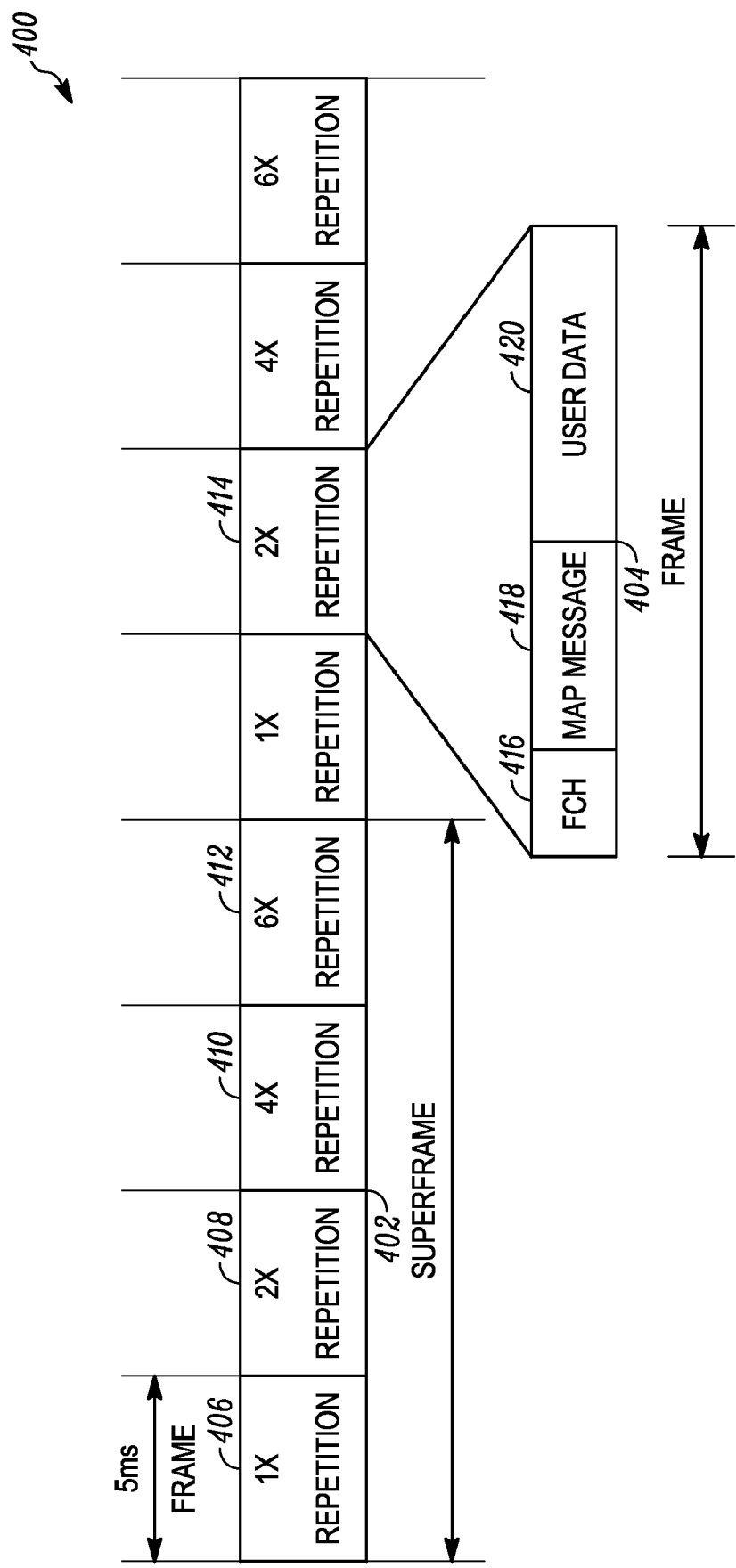
FIG. 4 is a structure of superframe in accordance with some embodiments of the invention.

FIG. 4 shows a structure of a superframe according to an embodiment of the present invention. The communication node employs a superframe 402 having a plurality of frames 406-412 for allocating a channel to the subscriber units. The frame 404 includes a media access protocol (MAP) message 418 for allocating a channel to the subscriber unit. The MAP message 418 is encoded in such a way so that the message can be decoded by the subscriber unit with the poorest signal quality. This may, however, result in adding a large amount of redundancy to the downlink MAP and the uplink MAP, thereby adding significant overhead. Thus, the scheduler 308 employs a simple repetition coding technique that can reduce the channel overhead. The repetition coding technique is a process where a plurality of transmit symbols in a frame are repeated multiple times. In an embodiment of WiMAX network, the transmit symbols are known as slots, which are combination of time symbols and frequency tones. The slots may be combined together to form a MAP portion and a user data portion of the frame. The MAP portion, which is known as MAP message, undergoes the repetition coding technique. In another embodiment, the repetition coding may also be applied to the user data portion.

In an embodiment, the MAP message in a frame is repeated multiple times depending upon the group of the subscriber unit to which the frame is to be transmitted. The number of times the MAP message is repeated is represented as a repetition factor or repetition rate of the frame. In one embodiment, the scheduler allows for simple repetition coding technique to be used on the MAP message 418 in addition to the base coding technique. The base coding technique may be a quadrature phase shift keying (QPSK), a binary phase shift keying (BPSK) or other coding technique. In another embodiment, different coding techniques such as changing the coding rate or modulation order is also applicable. For example, the superframe may consist of a QPSK frame, a 16-QAM frame, and a 64-QAM frame.

In an embodiment of FIG. 4, the superframe 402 has a plurality of frames 406, 408, 410, 412. For simplicity, the superframe 402 illustrates four frames with different repetition rates. There can be any number of frames in the superframe 402. Each frame includes a frame channel header (FCH) 416, at least one MAP message 418, and a user data 420. The MAP message 418 may be a downlink MAP (DL-MAP) or uplink MAP (UL-MAP). The FCH 416 represents the repetition rate employed for the frame. The frame may also cover other data that are not shown in the FIG. 4. Each frame may be of 5 ms duration and may have varying repetition rate. The repetition rate of each frame may range from 1× to 6×. The repetition rate may be more than 6× depending upon the coverage area of the communication network, the channel quality index of the channel associated with the subscriber unit, or any other criteria. The repetition coding may be applicable to any type of communication network without any changes in the standard, as the FCH sent prior to the MAP message indicates the type of repetition rate used for the frame.

As an example and referring to FIG. 1, there are four subscriber units 104-110 in group A (144) that can decode a MAP message 418 with 1× repetition rate of the frame 406, eight subscriber units 112-126 in group B (146) that require 2× repetition rate as in the frame 408, six subscriber units 128-138 in group C (148) that require 4× repetition rate as in the frame 410, and two subscriber units 140, 142 in group D (150) that require 6× repetition rate as in the frame 412. The superframe 402 of FIG. 4 could be employed for transmitting the frames to all of the subscriber units 104-142. The subscriber units that are capable of decoding the MAP message 418 with 1× repetition rate would be scheduled in the first frame 406 (upto 4 subscriber units). The subscriber units that are capable of decoding with 2× repetition rate would be scheduled in the next frame 408 (4+8=12 subscriber units). Similarly, 4× repetition rate in the next frame (4+8+6=18 subscriber units) 410, and 6× repetition rate in the next frame (4+8+6+2=20 subscriber units) 412. The criterion reported by the subscriber unit indicates the repetition rate required for the frame. In the prior art, a constant coding scheme is employed for all the groups, irrespective of the criteria reported by the subscriber units. Hence, even if the coding scheme is considered as 4×, the first frame is transmitted using 4 times more resources than a corresponding frame in the present invention and the second frame is transmitted using 2 times more resources than a corresponding frame in the present invention. These resources may be time and/or frequency resources.

In another embodiment, the scheduler has the flexibility of scheduling subscriber units reporting better criteria in any frame. Similarly, the scheduling subscriber units reporting poor criteria in frames 410 or 412. For example, a subscriber unit requiring frames with a repetition rate of 1× may be scheduled in a frame that has a repetition rate of 1×, 2×, 4×, or 6×. Similarly, a subscriber unit requiring a frame with a repetition rate of 6× can only be scheduled in a frame that has a repetition rate of 6×.

Figure 5:
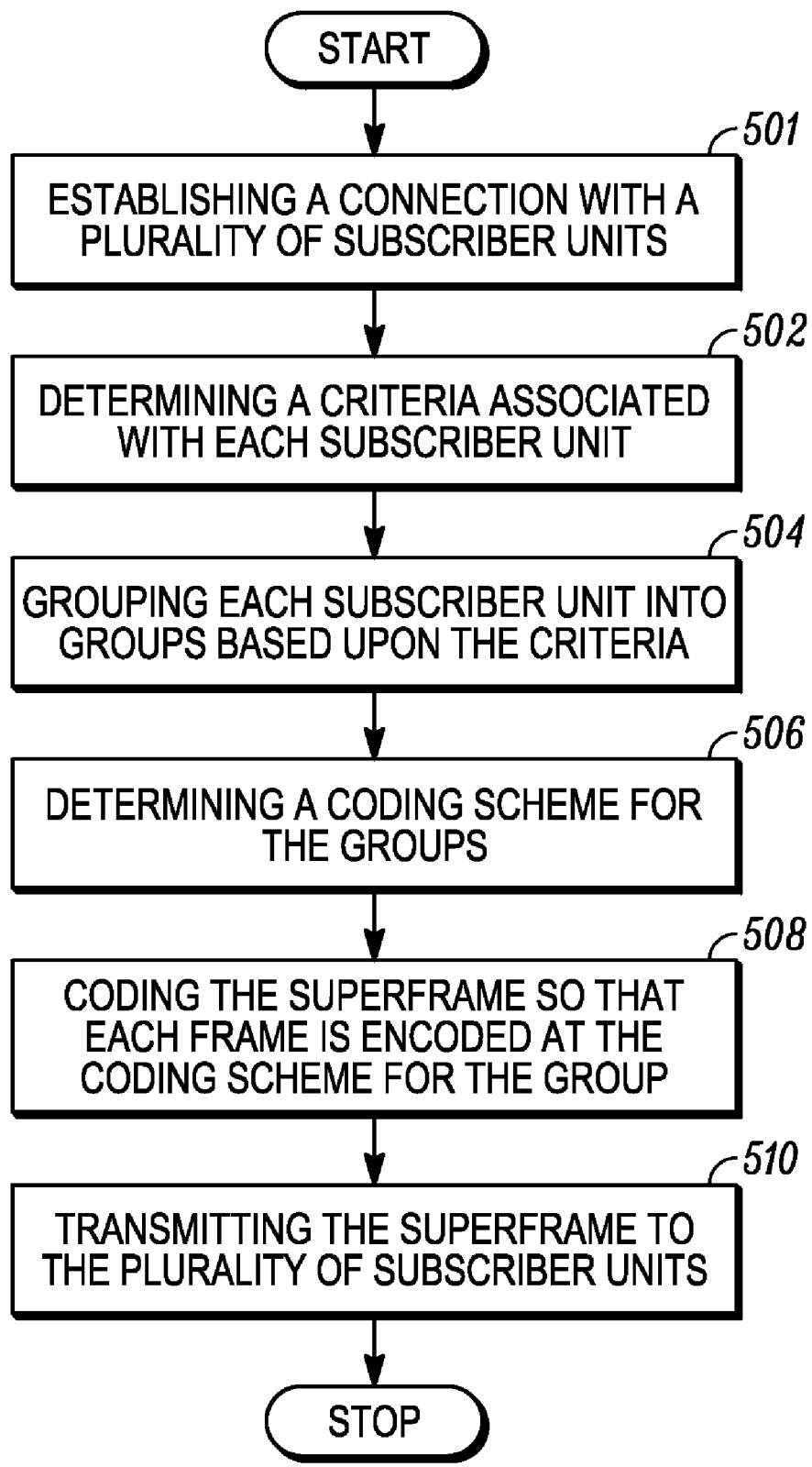
FIG. 5 is a flowchart of a method for transmitting a superframe across a communication network in accordance with some embodiments of the invention.

FIG. 5 is a flow chart illustrating a method for transmitting the frames across a communication network. The principles followed for this situation are described. The communication node establishes 501 a connection with a plurality of subscriber units in the communication network. The communication node determines 502 a criteria associated with each subscriber unit. The controller in the communication node groups 504 each subscriber unit into one of the plurality of groups based upon the criteria received from the subscriber units. The subscriber units in a group may have same criteria and each group has a different criteria.

The scheduler in the communication node determines 506 a coding scheme for each of the groups. The coding scheme assigned for the groups relates to the ability of the subscriber units in that group to decode a frame without any error. The frames may be encoded with a similar coding scheme for the group. The group with a low rate coding scheme may require a high repetition rate of the frame and the group with a high rate coding scheme may require a low repetition rate of the frame. The groups having a better criteria may have a high rate coding scheme and the groups having a poor criteria may have a low rate coding scheme. As an example and referring to FIG. 1, the groups 144, 146 may have high rate coding scheme as they are close to the communication node 102 and may have a better channel quality index. Similarly, the groups 148, 150 may have low rate coding scheme as they are away from the communication node 102 and may have a poor channel quality index. In the prior art, all the groups have same coding scheme irrespective of the criteria associated with the subscriber units. Moreover, the frames are transmitted with a constant coding scheme, even to the subscriber units residing at the edge of the communication network. Thus, in the prior art the frames are not effectively transmitted across the communication network.

The scheduler receives a series of frames from the controller. Further, the scheduler obtains each frame and encodes 508 the frame based upon the coding scheme for the group to which the frame is to be transmitted. In one example, the coding occurs for a portion of the frame, for example a MAP message. The encoding of the frame may be a repetition coding where the MAP message in the frame is repeated multiple times. If the superframe contains four frames to be transmitted to four different groups, the repetition rate may be varied or multiplied by 2× for each frame depending upon the group it is to be transmitted. The encoded superframes are transmitted 510 to the plurality of subscriber units using a transceiver. In an embodiment of FIG. 5, the process explains a downlink communication carried out in the communication node. In another embodiment, the same process may be implemented at the subscriber unit as an uplink communication.

Figure 6:
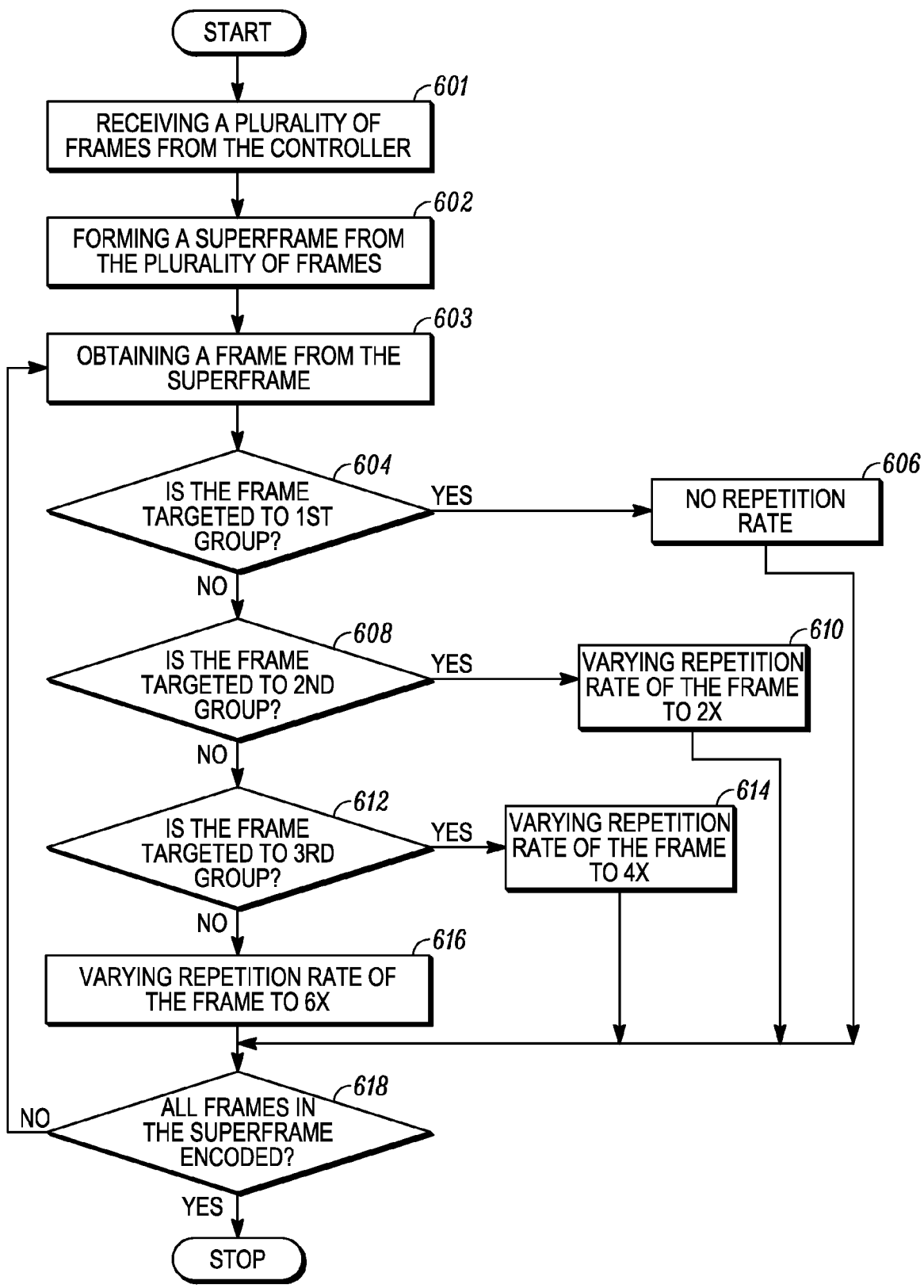
FIG. 6 is a flowchart for scheduling frames in a communication node in accordance with some embodiments of the invention.

FIG. 6 is a flow chart illustrating a process performed when the scheduler receives and encodes the frames, e.g. step 508 of FIG. 5. The scheduler of the communication node receives 601 the frames from the controller and forms 602 a superframe having a plurality of frames. The scheduler obtains 603 a frame from the superframe and chooses a repetition rate based upon the need for the group to which the frame is to be transmitted. Choosing the repetition rate of the frame means to vary the repetition rate of the frame, e.g., as in steps 606, 610, 614, 616 of FIG. 6.

For example, the scheduler obtains a frame and checks the group to which the frame is to be transmitted. If the frame is targeted 604 for the first group then it encodes 606 the frame with a repetition rate of 1×. If the frame is not targeted for the first group then the frame is checked to see whether the frame is targeted for the second group. If the frame is targeted 608 for the second group then the repetition rate of the frame 610 is varied to 2×. Varying the repetition rate to 2× means repeating the MAP message twice in a frame. Similar function is carried out for other repetition rate as well. If the frame is not targeted for the second group then the operation checks to see whether the frame is targeted for the third group. In case, the frame is targeted 612 for the third group then the repetition rate of the frame is varied 614 to 4×. If the frame is not targeted for the third group, then the frame is finally targeted for the fourth group and the repetition rate is varied 616 to 6×. The same process is continued for all the frames in the superframe. Finally, the superframe comprising encoded frames 618 are transmitted to the plurality of subscriber units in the communication network.

In another embodiment, the subscriber unit receives the frames transmitted by the communication node. The subscriber unit determines the repetition rate of the frame with the help of frame channel header (FCH) that is sent prior to the media access protocol (MAP) message. The frames may be transmitted at any repetition rate, irrespective of the standards of the communication network, as FCH indicates the repetition rate for the frame. The subscriber unit collects the repeated MAP messages in the frame and rebuilds the frame with an acceptable error or signal loss, as the repetition rate of the frame is varied depending upon the group of the subscriber unit.

In another embodiment, a frame with a high repetition rate can also be received by the groups that have high rate coding scheme. For example, a frame with 4× repetition rate targeted for the third group that have low rate coding scheme can also be received by the first and the second group that have high rate coding scheme. Similarly, a subscriber unit requiring a low repetition rate of the frame can also be scheduled in a frame with a high repetition rate. For example, the frames targeted for the first or second group may be transmitted with a repetition rate of 4× or 6×.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for transmitting a superframe having a plurality of frames from a communication node to a plurality of subscriber units in a communication network, the method comprising:
   determining a criteria associated with each subscriber unit of the plurality of subscriber units;
   grouping each subscriber unit into one of a plurality of groups based upon the criteria;
   determining a coding scheme for a broadcast control header of each one of the plurality of groups wherein at least one of the plurality of groups has its coding scheme of its broadcast control header different from at least another one of the plurality of groups, wherein determining a coding scheme includes determining a repetition rate of a plurality of transmit symbols in each frame;
   coding the superframe so that the broadcast control header of each frame is encoded at the broadcast control header coding scheme for the group, wherein coding the superframe comprises repeating a plurality of transmit symbols multiple times according to the repetition rate; and
   transmitting the superframe to the plurality of subscriber units.

2. The method as claimed in claim 1, wherein the criteria is based upon at least one of (a) a channel quality index, and (b) a distance from the communication node.

3. The method as claimed in claim 2, wherein the channel quality index is based upon at least one of (a) a signal strength, (b) a signal to noise ratio, and (c) a forward error rate of the frame.

4. The method as claimed in claim 1, wherein each of the groups has a different criteria.

5. The method as claimed in claim 1, wherein determining the coding scheme further comprises assigning a high repetition coding scheme for the groups having a poor criteria.

6. The method as claimed in claim 1, wherein coding the superframe further comprises coding a media access protocol message of each frame, the media access protocol message is for allocating a channel to each subscriber unit.

7. The method as claimed in claim 1, wherein coding the superframe further comprises determining a repetition rate for each frame.

8. The method as claimed in claim 7, wherein determining the repetition rate further comprises ascertaining criteria of each group to use a low repetition rate for groups having a better criteria and to use a high repetition rate for groups having a poor criteria.

9. The method as claimed in claim 1, wherein the superframe transmitted to the groups having a poor criteria is also received by the groups having a better criteria.

10. A system for transmitting a superframe having a plurality of frames across a communication network, the system comprising:
    a plurality of subscriber units; and
    a communication node capable of communicating with each subscriber unit, the communication node comprising:
    a hardware interface receiving a criteria associated with each subscriber unit;
    a controller coupled to the hardware interface, wherein the controller groups each subscriber unit into one of a plurality of groups based upon the criteria received from the hardware interface;
    a scheduler coupled to the controller for assigning a coding scheme for a broadcast control header of the groups and coding the broadcast control header for the plurality of frames so that each frame is encoded at the coding scheme for the groups, wherein assigning a coding scheme includes assigning a repetition rate for a plurality of transmit symbols in each frame and coding the broadcast control header comprises repeating the plurality of transmit symbols in each frame multiple times according to the repetition rate, further wherein at least one of the broadcast control header for the plurality of groups has its coding scheme different from at least another one of the broadcast control header for the plurality of groups; and a transceiver coupled to the hardware interface for transmitting the superframe to the plurality of subscriber units.

11. The system as claimed in claim 10, wherein the criteria is based upon at least one of (a) a channel quality index, and (b) a distance from the communication node.

12. The system as claimed in claim 10, wherein the frame includes a media access protocol message for allocating a channel to each subscriber unit.

13. The system as claimed in claim 10, wherein each of the groups has a different criteria.

14. The system as claimed in claim 10, wherein the scheduler assigns a high rate coding scheme for the groups having a better criteria and a low rate coding scheme for the groups having a poor criteria.

15. The system as claimed in claim 10, wherein the scheduler assigns a repetition rate for each frame.

16. The system as claimed in claim 15, wherein the scheduler ascertains the criteria of the group to use a low repetition rate for the groups having a better criteria.

17. The system as claimed in claim 10, wherein the communication network is an IEEE 802.16 standard network.

18. A communication node comprising:

a hardware interface receiving a criteria associated with each subscriber unit;

a controller coupled to the hardware interface, wherein the controller groups each subscriber unit into one of a plurality of groups based upon the criteria received from the hardware interface; and a scheduler coupled to the controller for assigning a coding scheme for a broadcast control header for the groups and coding the plurality of frames so that each of the broadcast control headers for the frames is encoded at the coding scheme for the groups, wherein assigning a coding scheme includes assigning a repetition rate for a plurality of transmit symbols in each frame and coding the broadcast control header comprises repeating the plurality of transmit symbols in each frame multiple times according to the repetition rate.

19. The communication node as claimed in claim 18 further comprising a transceiver coupled to the hardware interface for transmitting the frames to the plurality of subscriber units.

20. The communication node as claimed in claim 18 further comprising a processor coupled to the controller for interfacing to a user application.

* * * * *